Sept. 6, 1927.  W. L. PAUL  1,641,688
MOUNTING FOR DISKS
Filed Sept. 2, 1921   3 Sheets-Sheet 1

Witness;
E. Wilderson

Inventor:
William L. Paul
by W. H. Bliss
Attorney

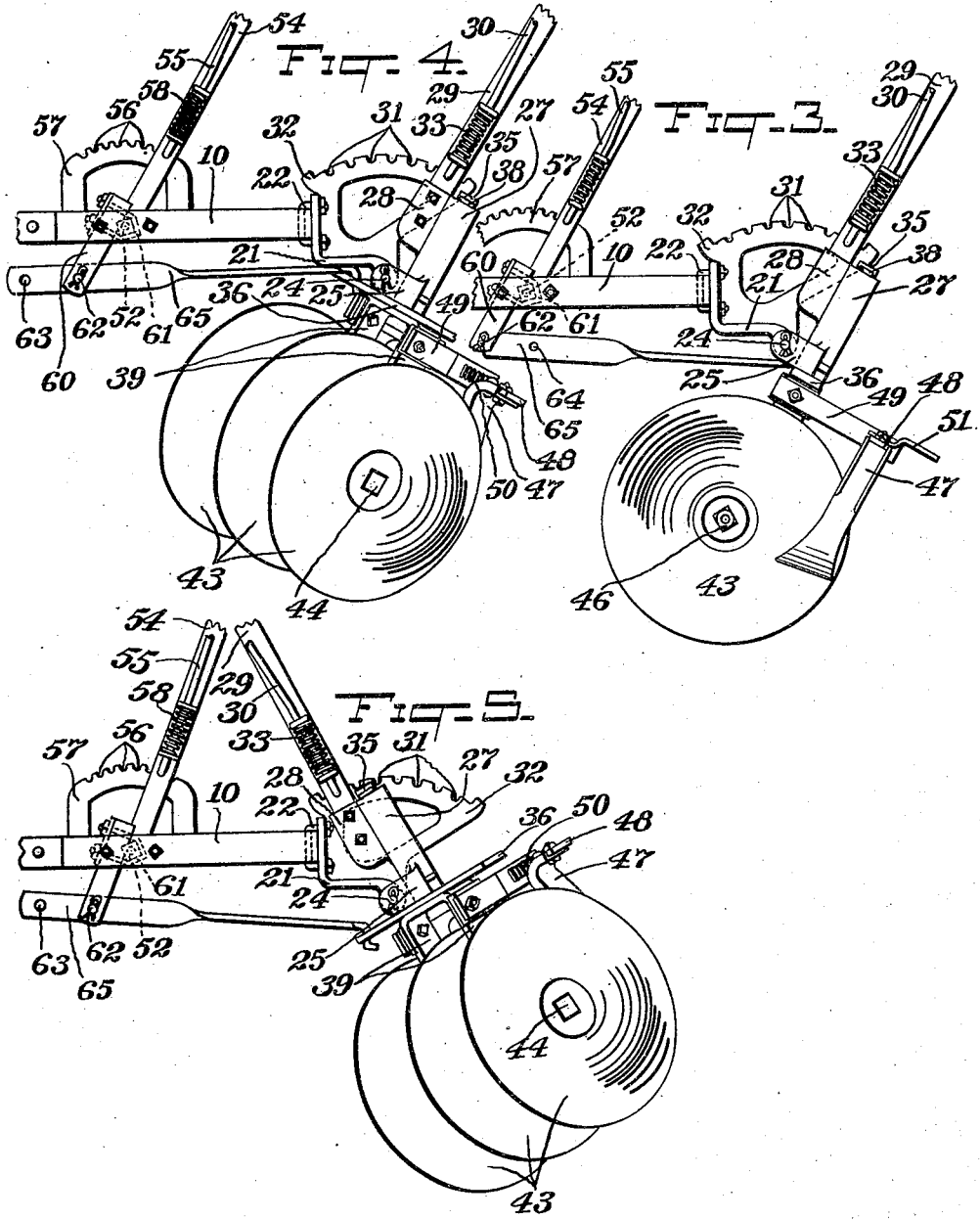

Sept. 6, 1927.  W. L. PAUL  1,641,688
MOUNTING FOR DISKS
Filed Sept. 2, 1921  3 Sheets-Sheet 3
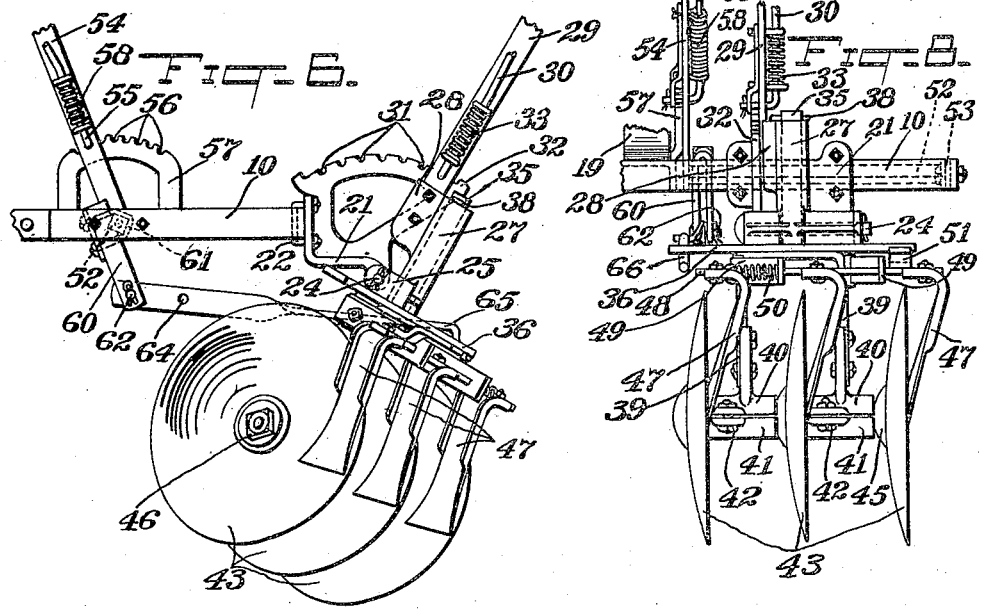
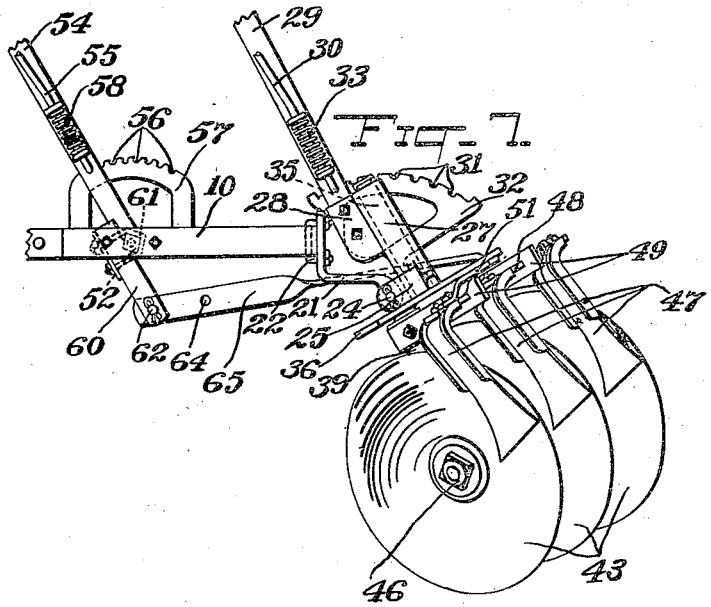

Patented Sept. 6, 1927.

1,641,688

UNITED STATES PATENT OFFICE.

WILLIAM L. PAUL, OF BERKELEY, CALIFORNIA, ASSIGNOR TO DEERE & COMPANY, OF MOLINE, ILLINOIS, A CORPORATION OF ILLINOIS.

MOUNTING FOR DISKS.

Application filed September 2, 1921. Serial No. 497,859.

The invention is in earth working implements of the class in which frame connected concavo-convex disks are employed for operating upon the soil, and relates particularly to the means of supporting the soil working disks from the frame.

It is well understood with respect to implements of this class, that when the disks are positioned with their axes aligned transversely relative to the line of advance, the disks are ineffective as soil cutters and with the disks so positioned the implement may be transported without any considerable action on the soil.

It is likewise well understood that an effective soil cutting action is obtained from such implements by positioning the disks with their axes at an angle to the line of advance, and furthermore that when the disks are so positioned, by tilting the disks so their axes are inclined to the horizontal, the disks will effectively operate on inclined surfaces, such as the downwardly and inwardly converging faces of trenches or the downwardly and outwardly diverging faces of ridges, and that under any of these various conditions the soil may be either thrown outwardly or inwardly, depending upon whether the disks are positioned with their concave faces toward the sides or toward the center of the implement.

It is common practice in some sections of the country to ridge the fields where row crops are to be planted. In some instances the seed is planted on the ridges, in other instances in the bottom of the trenches depending upon the characteristics of the plant, the condition of the soil, and the season. It is therefore desirable that the implement used for cultivating such fields be adapted for working either the downwardly diverging sides of the ridges or the downwardly converging sides of the trenches.

The implements heretofore devised for work of this character, with which I am familiar, have had the disks mounted in gangs and have been provided with means for moving the axes of the disks relative to the frame to carry the disks into and out of cutting angle, and have also been provided with means for inclining the axes of the disks relative to the frame and to the horizontal to position the disks for trench or ridge work, but this latter position for the disks was obtained by tilting the disk or gang supports laterally with respect to the implement frame and was in the nature of a fixed adjustment, therefore the disks were still inclined with respect to the frame and to the horizontal after the axes of the disks were moved out of cutting angle and into transverse alignment; consequently when turning the implement on the headland at the ends of trenches or ridges or when moving it from field to field while adjusted for such work, the weight of the entire implement was sustained by the inner disks of each gang, or the outer disk of each gang, depending upon the particular adjustment of the gangs. The excessive weight thus imposed on the two supporting disks forced them to cut into and tear the soil, which was often objectionable. At such times these implements were unstable and were disposed to rock laterally, particularly when supported on the two innermost disks, and furthermore the disk gang bearings and boxes were subjected to severe and improper strains.

In contrast with these earlier implements, the disks of the improved implement herein described are supported from the frame in such a manner that when they are adjusted for trench or ridge work and they are moved into and out of cutting angle, such movement of the disks will simultaneously and automatically, respectively incline and straighten their axes with respect to horizontal planes.

It is an object of the invention to provide improved means for supporting the disks from the frame.

It is also an object of the invention to provide means for supporting the disks from the frame that can be adjusted so that the shifting of the disks into and out of cutting angle will simultaneously tilt the disks into and out of inclined position relative to the horizontal.

It is a further object of the invention to provide for adjusting the disk supports to regulate the inclination relative to the horizontal that the disks assume when moved into cutting angle.

Other objects and advantages of the invention are fully disclosed in the following specification and drawings.

Referring to the drawings which illustrate the preferred form of the invention and in which like numerals designate corresponding parts.

Fig. 3 is a fragmentary side elevation showing the supporting means that connect the earth working disks with the frame adjusted to an inclined position, the disks being in transverse alignment.

Fig. 4 is a fragmentary side elevation, the concave side of the disks facing the center, and the disks positioned to work on the side of a ridge.

Fig. 5 is a view similar to Fig. 4 but with the disks positioned to work on the side of a trench.

Fig. 6 is a fragmentary side elevation but with the convex side of the disks facing the center, the disks positioned to work on the side of a trench.

Fig. 7 is a view similar to Fig. 6 but with the disks positioned to work on the side of a ridge.

Fig. 8 is a fragmentary rear elevation with the disks adjusted to the position seen in Fig. 1.

Figure 1:
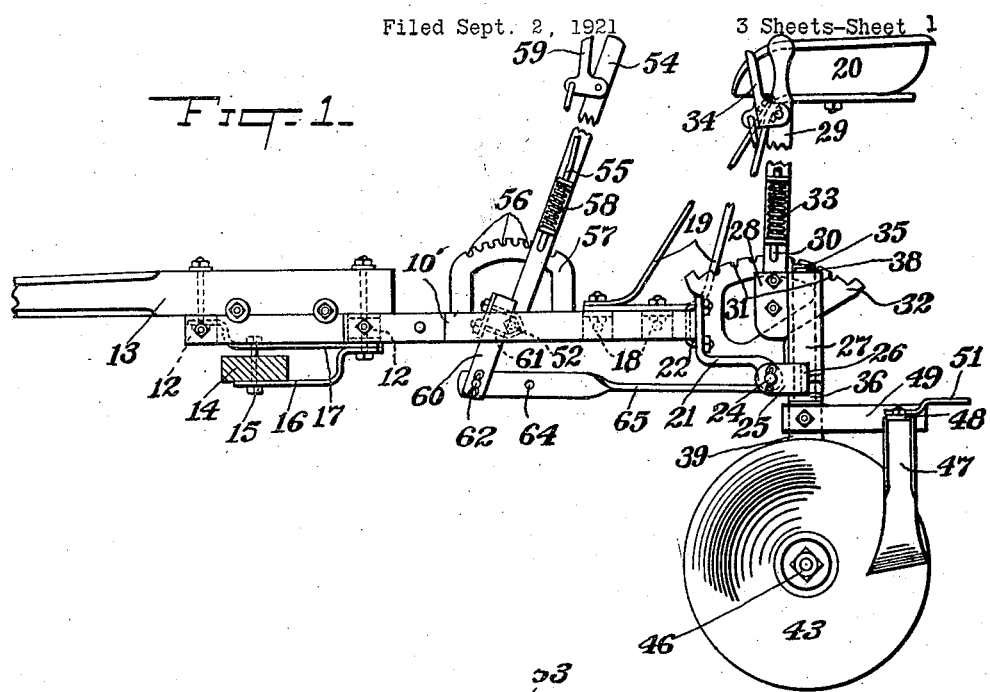
Fig. 1 is a side elevation of a machine embodying the invention, the earth working disks being shown in transverse alignment.

Referring to the details of construction, a rectangular frame is formed by a bent bar 10, the separated ends of which extend forwardly near the middle of the front side of the frame, and are connected with the forwardly projecting ends of a U-shaped center frame member 11, which are connected by suitable spacing brackets 12—12, the closed end of the member 11 being secured to the bar 10 at the middle of the rear side of the frame, the whole forming a substantial connection and support for the earth working devices.

When draft animals are used to draw the implement a pole 13 is secured to the forwardly extending portion of the frame formed by the bars 10—11 and the spacing brackets 12, and a draft bar 14 is mounted on a coupling pin 15 carried by a draft bracket formed by the straps 16—17 which are secured to the forwardly extending portion of the frame.

If it is desired to draw the implement with a tractor, the pole and draft bar can be removed and the draw bar of the tractor can be hitched to the coupling pin 14.

Spacing brackets 18—18 are secured between the rear portions of the centre frame member and support seat bars 19—19 upon which is mounted the operator's seat 20.

A bracket 21 for supporting the tool carrier is securely clamped by clip bolts 22 to the frame bar 10 at each side of the middle of the frame, but the brackets can be shifted along the frame bar to properly space the earth working tools relative to the plant row by loosening the bolts 22. Each bracket 21 is formed with a horizontal bearing portion 23 in which is supported a pin 24 upon which is pivotally mounted the ears 25—25 of a yoke like member 26 having a sleeve portion 27.

Extending preferably from the sleeve portion 27 of each yoke is a socket like lug 28 to which is secured a lever 29, the latter carrying the usual plunger lock rod 30 adapted to engage the notches 31 of a lever rack 32 that is carried by the bracket 21. The usual spring 33 is mounted on the lever to cause the plunger rod to engage the notches of the rack and the lever is also provided with the customary handle 34 to lift the plunger rod against the tension of the spring 33, to release the lever from its rack.

Pivotally mounted in each sleeve 27 is a tool carrier, comprising a stem 35 to the lower end of which is rigidly secured a transverse bar 36, the latter having an opening 37 therethrough near each end. The stem is held in place in its sleeve by a spring cotter 38 extending through the stem above the sleeve.

Securely attached to the under side of each bar 36 is a downwardly projecting bracket 39 in the form of an inverted U best seen in Fig. 8, and to the lower end of each arm of the bracket is bolted a half box 40 that receives the disk bearing, the other half box for the bearing being indicated by the numeral 41, the two halves of the box being held together by bolts 42. The soil working tools, in this instance a plurality of disks, are arranged in the form of a gang in the usual manner wherein the disks 43 are mounted on a headed square shaft 44 and are held in spaced relation by bearing sleeves 45 which are journaled in the boxings 40—41, the shaft being threaded at its opposite end and provided with a nut 46 to hold the gang assembled.

A set of scrapers is provided for each gang for cleaning the disks when desired. The scraper blades 47 are secured in spaced relation to a longitudinally movable bar 48 which is supported by arms 49—49 that extend forwardly and are securely bolted to bracket 39. A spring 50 mounted on the bar 48 between one of the arms 49 and a suitable abutment carried by the bar, such as one of the scraper blades, acts to press the bar endwise and hold the scraper blades against the concave faces of the disks.

When it is desired to shift the scraper blades away from the disks, a cam lever 51, pivotally mounted on the bar 48 near one of the arms 49, can be turned, the end of the lever engages the arm 49, and moves the bar 48 endwise against the pressure of the spring 50 carrying the scrapers out of engagement with the disks.

Each side of the frame supports a rock shaft 52, square in cross section but having its ends formed into round pins, the pin at the inner end being journaled in the frame bar 11 and the one at the outer end in a bearing 53 secured to the frame bar 10. A lever 54 secured to each rock shaft carries the usual plunger lock rod 55 adapted to engage the notches 56 of a lever rack 57 that is secured to the frame bar 11. The usual spring 58 is mounted on the lever to cause the plunger rod to engage the notches of the rack, and the lever is also provided with the customary handle 59 to lift the plunger rod against the tension of the spring 58 to release the lever from its rack.

An arm 60 is clamped by a clip bolt 61 to each of the rock shafts so as to be adjustable longitudinally thereof, and at its lower end the arm 60 is pivotally connected by pin 62 to one or the other of holes 63—64 provided in the forward end of a link 65, the rear portion of which is formed into a hooklike attachment 66 adapted to engage the hole 37 in the end of the transverse bar 36 of the gang unit that is toward the center of the machine.

From the foregoing description it will be understood that by means of the levers 29, the yoke members 26 and disk carriers with the disk gang units carried thereby can be rocked about the horizontally disposed pivot pins 24 of the frame brackets 21, and that with the levers 54 and their link connections 65 to the transverse bars 36 of the disk carriers, the latter together with their stems 35 and the disk gangs can be swiveled relative to the sleeves 27.

Figure 2:
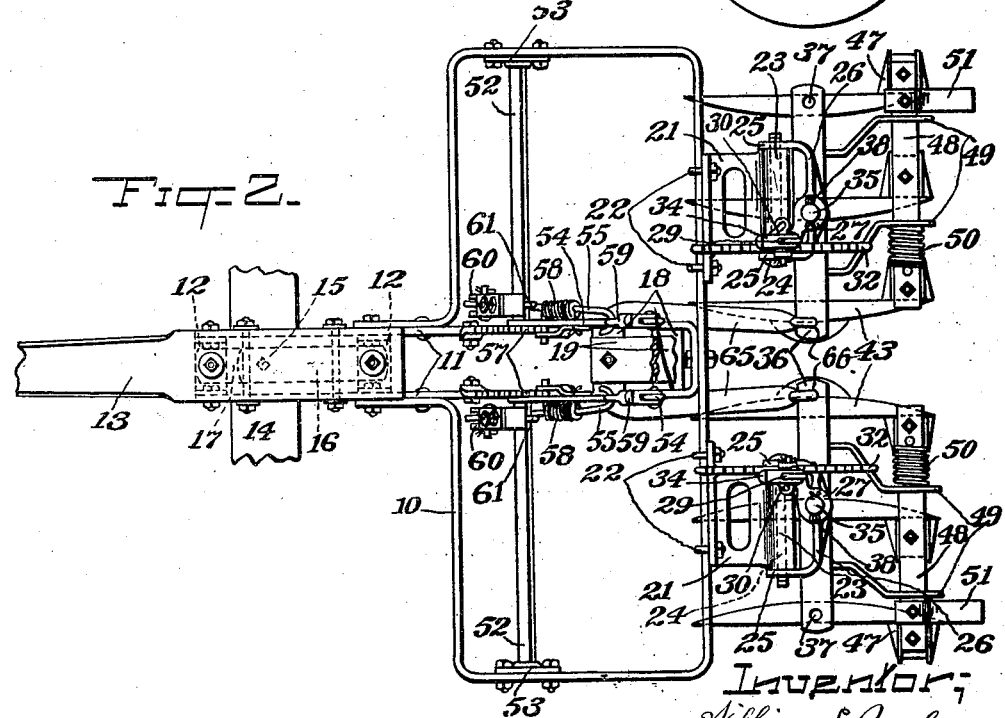
Fig. 2 is a top plan view of the machine as shown in Fig. 1.

If the implement is to be used on a field the surface of which is smooth, the operator will adjust the levers 29 so the sleeves 27 are in vertical position as shown in Fig. 1, and assuming it is desired to throw the soil away from the center or plant row, the disk gangs are turned in the sleeves 27 so the concave faces of the disk are toward the sides as shown in Figs. 1 and 2. The arms 60 are connected to the front holes 63 in the forward ends of the links 65, the rear ends of the links are attached to the inner ends of the transverse bars 36, so that when the levers 54 are shifted forwardly, the inner ends of the gangs will be moved back, the gang stems 35 swiveling in the sleeves 27, thereby shifting the axes of the disks relative to transverse vertical planes and carrying the disks into cutting angle in a manner that is common with the ordinary disk harrow. To move the disks into non-cutting position the operator shifts the lever 54 to its rearward position as shown in Fig. 1 which brings the axes of the disks into transverse alignment.

Assuming however that the field has been ridged and that the plants to be cultivated are in the bottom of the trenches formed by the ridges and that it is desired to throw the soil away from the center or plant rows, the levers 29 are shifted rearwardly, thereby tilting the yokes 26 and sleeves 27 to an inclination relative to the vertical as shown in Fig. 3. If the levers 54 be now shifted forwardly, the inner ends of the gangs will be moved back carrying the disks into cutting angle, the gang stems 35 swiveling in the sleeves 27, but owing to the swivel axes now being inclined, due to the tilting of the upper ends of the sleeves 27 and stems 35 rearwardly, the axes of the disks will swing to an inclined position relative to horizontal planes simultaneously with their movement out of transverse vertical planes, and they will assume the position shown in Fig. 6 wherein the axes of the disks converge downwardly and rearwardly. To move the disks into non-cutting position, and with their axes transversely aligned, the operator simply shifts the levers 54 back to their rearward position as shown in Figs. 1 and 3.

If the plants to be cultivated are on the tops of the ridges and it is desired to throw the soil away from the plant rows, the levers 29 are shifted forwardly to tilt the yokes 26 and the sleeves 27 to a forward inclination relative to the vertical. If the levers 54 be now shifted forwardly the inner ends of the gangs will be moved back carrying the disks into cutting angle, the gang stems 35 swiveling in the sleeves 27, but owing to the direction of inclination of the sleeves 27 and stems 35, comprising the swivel axes, being opposite to that shown in Fig. 6, the axes of the disks, simultaneously with their movement out of transverse vertical planes, will swing to an inclined position relative to the horizontal, opposite to that shown in Fig. 6, and they will assume the position shown in Fig. 7 wherein the axes of the disks converge upwardly and rearwardly. To transversely align the disks and make them non-effective as cutters the operator simply shifts the levers 54 back into their rearward position.

If the implement is to be used on a field the surface of which is smooth and it is desired to throw the soil toward the center or plant row, the operator will adjust the levers 29 so the sleeves 27 are vertical as seen in Fig. 1, the links 65 are detached from the transverse bars 36 and the disk gangs are turned end for end by rotating the stems 35 in the sleeves 27 so that the concave faces of the disks are toward the center, the links 65 are attached to the holes 37 in the ends of the transverse bars now toward the center, the levers 54 are shifted to their forward position on the racks 57, the rock shaft arms 60 are connected with the holes 64 in the forward ends of the links 65, whereupon by shifting the levers 54 rearwardly the inner ends of the gangs will be drawn forwardly, the gang stems 35 swiveling in the sleeves 27, carrying the disks into cutting angle in a manner that is well known. To realign the disks transversely the levers 54 are shifted to their forward position.

If however the field has been ridged and the plants to be cultivated are on the tops of the ridges and it is desired to throw the soil toward the center or plant row, the levers 29 are shifted rearwardly thereby tilting the yokes 26 and sleeves 27 to an inclination relative to the vertical as shown in Fig. 4. If the levers 54 be now shifted rearwardly the inner ends of the gang will be moved forward, carrying the disks into cutting angle, and owing to the swivel axes formed by sleeves 27 and stems 35 being inclined, the axes of the disks will swing to an inclination relative to the horizontal simultaneously with their movement into cutting angle, and the disk gangs will assume the position shown in Fig. 4 wherein the axes of the disks converge upwardly and forwardly. To return the disks from this position to non-cutting position with their axes transversely aligned, it is only necessary to shift the levers 54 to their forward position.

If the side walls of the trenches are to be disked and it is desired to throw the soil toward the center, or toward the plants, in the event the seed has been placed in the trenches, the levers 29 are shifted forwardly to tilt the yokes 26 and the sleeves 27 to a forward inclination relative to the vertical. If the levers 54 be now shifted rearwardly the inner ends of the gangs will be moved forward carrying the disks into cutting angle, the gang stems 35 swiveling in the sleeves 27, but owing to the direction of inclination of the sleeves 27 and stems 35, comprising the swivel axes, being opposite to that shown in Fig. 4, the axes of the disks, simultaneously with their movement out of transverse vertical planes, will swing to an inclination relative to the horizontal opposite to that shown in Fig. 4 and will assume the position as seen in Fig. 5 wherein the axis of the disks converge downwardly and forwardly. To restore the gangs to non-cutting position in which the axes of the disks are in alignment both with respect to transverse vertical planes and horizontal planes, the levers 54 are shifted to their forward position on the racks 57.

It will be understood that under any conditions of adjustment of the gangs described, the operator can govern the amount of cutting angle given the disks, or the extent to which the axes of the gangs will be inclined, relative to the horizontal, by the distance the levers 54—29, respectively, are moved along their racks, and that by the proper adjustment of the two sets of levers any desired combination of the two angles may be obtained; furthermore the gang at either side is adjustable independently of the other and regardless of how much or how little the levers 29 are shifted to tilt the sleeves 27 and stems 35, away from the vertical, either forward or rearward, when a gang is moved into cutting angle with its lever 54 it is simultaneously and automatically inclined relative to the horizontal, and when a gang is moved from cutting angle to non-cutting position, in which its axis is aligned with respect to transverse vertical planes, the axis of the gang is likewise simultaneously and automatically aligned with respect to horizontal planes.

It will be understood that when the supporting brackets 21 are shifted along the frame bar 10 to vary the spacing between the gangs of disks, the arms 60 are likewise shifted along the rock shafts 52 to maintain the proper relationship between the levers 54 and the gangs; also that when the gangs are reversed end for end, so the concave faces of the disks are toward the center instead of toward the sides, or vice versa, the scraper supporting arms 49 are unbolted from the brackets 39 and the scraper units transposed from one gang to the other and rebolted in place.

While I have used the term "gang" in connection with the description of the sets of disks, I do not wish to limit myself in all cases to a plurality of disks in each set or to a plurality of sets, for there are instances where it is advantageous to mount a single disk in the manner described.

So far as I am aware I am the first in the art to provide a support for a disk gang that will automatically incline the disks relative to the horizontal by the movement of the disks into cutting angle, and that will automatically straighten the disks relative to the horizontal by the movement of the disks from cutting angle to non-cutting position. My invention is therefore generic in character and the claims are to be construed accordingly. While it is possible that variations may be made in the structure illustrated and herein particularly described it is my intention that all such possible modifications as are within the spirit of my invention shall be covered by the following claims.

What I claim is:

1. A machine of the class described comprising a frame, a gang of earth working disks laterally spaced apart, means pivotally connecting said gang with the frame to turn about an upwardly extending axis and to swing fore and aft, and means operable to effect said turning and swinging movements coincidently to vary simultaneously the angular position of the disks with respect to the line of draft, and their relative vertical position.

2. A machine of the class described comprising a frame, a gang of earth working disks laterally spaced apart, a shaft on which said disks are mounted, a support for said shaft pivotally connected with the frame to turn about an upwardly extending axis, and to swing fore and aft, and means operable to effect said turning and swinging movements coincidently, to vary simultaneously the angular position of the disks with respect to the line of draft, and their relative vertical position.

3. A machine of the class described comprising a frame, a gang of earth working disks laterally spaced apart, means pivotally connecting said gang with the frame to turn about an upwardly extending axis and to swing fore and aft, and means acting on fore and aft movement of the gang to turn the same about its upwardly extending axis, whereby the angular position of the disks with reference to the line of draft and their relative vertical position are simultaneously varied.

4. A machine of the class described comprising a frame, a gang of laterally spaced coaxially disposed rotatable disks connected with the frame and adjustable to coincidently vary the angular relation of the axis of said disks with reference to a horizontal plane and to a transverse vertical plane, means operable to so adjust said gang, and means for holding the gang in its different positions of adjustment.

5. A machine of the class described comprising a frame, a gang of axially alined rotatable disks connected with the frame to turn about an upwardly extending axis, and arranged to swing fore and aft to vary the inclination of such axis with reference to a transverse vertical plane, means for holding said gang in its different positions of adjustment, and means acting on variation of the angular position of such axis with reference to a transverse vertical plane, to turn said gang about said upwardly extending axis.

6. A machine of the class described comprising a frame, a gang of axially alined rotatable disks connected with the frame to turn about an upwardly extending axis, and arranged to swing fore and aft to vary the inclination of such axis with reference to a transverse vertical plane, means for holding said gang in its different positions of adjustment, and means interposed between said gang and the frame and acting on variation of the angular position of such axis with reference to a transverse vertical plane, to turn said gang about said upwardly extending axis.

7. In a machine of the class described the combination with a frame and a gang of laterally spaced earth working disks, of means for connecting the gang with the frame to turn about an upwardly extending axis and to swing fore and aft, comprising a bracket secured to the frame, a sleeve pivoted to said bracket to rock fore and aft, means for securing said sleeve in its different positions of adjustment, a transverse bar secured to the gang, an upwardly extending stem carried by said bar between its ends and swiveled in said sleeve, and a link connected with the frame and adapted to be connected with either end portion of said bar.

8. In a machine of the class described the combination with a frame and a gang of laterally spaced earth working disks, of means for connecting the gang with the frame to turn about an upwardly extending axis and to swing fore and aft, comprising a bracket secured to the frame, a sleeve pivoted to said bracket to rock fore and aft, means for securing said sleeve in its different positions of adjustment, a transverse bar secured to the gang, an upwardly extending stem carried by said bar between its ends and swiveled in said sleeve, and an endwise adjustable link connected with the frame and adapted to be connected with either end portion of said bar.

9. In a machine of the class described the combination with a frame, and gangs of laterally spaced earth working disks at opposite sides of said frame, of means for connecting each of said gangs with the frame to turn about an upwardly extending axis and to swing fore and aft, comprising a bracket secured to and shiftable transversely of the frame, a sleeve pivoted to said bracket to rock fore and aft, means for securing said sleeve in its different positions of adjustment, an upwardly extending stem carried by the gang and swiveled in said sleeve, a link connected with the gang at one side of the axis of said stem, and a transversely shiftable connection between said link and the frame.

WILLIAM L. PAUL.